US007177934B2

United States Patent
Matena et al.

(10) Patent No.: US 7,177,934 B2
(45) Date of Patent: *Feb. 13, 2007

(54) METHOD AND APPARATUS FOR PROVIDING APPLICATION SPECIFIC STRATEGIES TO A JAVA PLATFORM INCLUDING START AND STOP POLICIES

(75) Inventors: Vladimir Matena, Redwood City, CA (US); Rahul Sharma, Sunnyvale, CA (US); Masood Mortazavi, Cupertino, CA (US); Sanjeev Krishnan, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 764 days.

This patent is subject to a terminal disclaimer.

(21) Appl. No.: 09/812,536

(22) Filed: Mar. 19, 2001

(65) Prior Publication Data

US 2002/0144002 A1 Oct. 3, 2002

(51) Int. Cl.
G06F 15/173 (2006.01)
G06F 9/455 (2006.01)
G06F 9/46 (2006.01)
G06F 3/00 (2006.01)

(52) U.S. Cl. .................. 709/226; 718/1; 719/312; 719/316

(58) Field of Classification Search ............. 709/226, 709/218; 717/120; 707/204; 718/105, 104, 718/1, 100; 719/312, 316
See application file for complete search history.

(56) References Cited

U.S. PATENT DOCUMENTS 5,175,854 A    12/1992  Cheung et al. ............. 395/650
5,313,631 A *   5/1994  Kao .......................... 707/204
5,802,258 A *   9/1998  Chen ........................... 714/10
6,167,427 A *  12/2000  Rabinovich et al. ........ 709/201

(Continued)

FOREIGN PATENT DOCUMENTS

WO    WO 00/10084    2/2000

(Continued)

OTHER PUBLICATIONS

Clarke and Coulson, "*An Architecture for Dynamically Extensible Operating System*", Aug. 8, 1998 IEEE, pp. 145-155, Multimedia Research Group, Lancaster, UK, [mwc,geoff]©comp.lancs.ac.uk.

(Continued)

*Primary Examiner*—William Vaughn
*Assistant Examiner*—Michael Delgado
(74) *Attorney, Agent, or Firm*—Martine Penilla & Gencarella, LLP

(57) ABSTRACT

An invention is disclosed for a control module, executed as part of an application, that includes application-specific strategies for the application, yet can be coded using the JAVA programming language. In one embodiment, a system for providing application-specific strategies to a JAVA platform is disclosed that includes a runtime subsystem and an application, which includes a control module in communication with the runtime subsystem. The application further includes a plurality of service modules in communication with the control module. The control module includes application-specific policies for the application, which are programmed using a JAVA programming language. The control module manages the service modules, and also is capable of starting a child application by starting a child control module, which is part of the child application.

15 Claims, 16 Drawing Sheets

U.S. PATENT DOCUMENTS

| | | | | |
|---|---|---|---|---|
| 6,393,459 | B1* | 5/2002 | Lurndal | 709/203 |
| 6,463,454 | B1* | 10/2002 | Lumelsky et al. | 718/105 |
| 6,516,350 | B1* | 2/2003 | Lumelsky et al. | 709/226 |
| 6,529,950 | B1* | 3/2003 | Lumelsky et al. | 709/218 |
| 6,665,861 | B1* | 12/2003 | Francis et al. | 717/120 |
| 6,704,764 | B1* | 3/2004 | Ottati | 718/100 |
| 2002/0078213 | A1* | 6/2002 | Chang et al. | 709/229 |

OTHER PUBLICATIONS

Jørgensen, Truyen, Matthijs, and Joosen, "*Customization of Object Request Brokers by Application Specific Policies*", 2000, pp. 144-163, XP009016120, Maersk Mc-Kinney Moller Inst., Denmark, bnj@mip.sdu.dk, and Computer Science Dept., Belgium, eddy.truyen@cs.kuleuven.ac.be.

Corradi, Leonardi, and Zambonelli, "*Dynamic Load Distribution in Massively Parallel Architectures: the Parallel Objects Example*", Jul. 1994 IEEE, pp. 318-322, Dipartimento di Elettronica Informatica e Sistemistica, Bologna, Italy, antonio@deis33.cineca.it.

Nangsue and Conry, "*Fine-Grained Multiagent Systems for the Internet*", 1998 IEEE, pp. 198-205, Dept. of Electrical and Computer Eng., Clarkson University, Potsdam, NY nangsue@sun.soe.clarkson.edu.

T. Fahringer, "*JavaSymphony: A System for Development of Locality-Oriented Distributed and Parallel Java Applications*", 2000 IEEE, pp. 145-152, Inst. For Software Science, University of Vienna, Vienna, Austria tf@par. univie.ac.at.

Obelöer, Grewe, and Pals, "*Load Management with Mobile Agents*", 1998 IEEE, pp. 1005-1012, Inst. For Technische Informatik, Medizinische Universität zu Lübeck, Germany obeloeer@iti.mu-luebeck.de.

Dikshit, Tripathi, and Jalote, "*SAHAYOG: A Test Bed for Evaluating Dynamic Loadsharing Policies*", XP000098633, May 1989, vol. 19, No. 5, pp. 411-435, Software Practice and Experience, Sussex, GB.

\* cited by examiner

METHOD AND APPARATUS FOR PROVIDING APPLICATION SPECIFIC STRATEGIES TO A JAVA PLATFORM INCLUDING START AND STOP POLICIES

CROSS REFERENCE TO RELATED APPLICATIONS

This application is related to U.S. patent application Ser. No. 09/812,537, filed Mar. 19, 2001, and entitled "Method and Apparatus for Providing Application Specific Strategies to a Java Platform including Load Balancing Policies," which is incorporated herein be reference.

BACKGROUND OF THE INVENTION

1. Field of the Invention

This invention relates generally to JAVA programming, and more particularly to methods for allowing application specific life cycle strategies in a JAVA environment.

2. Description of the Related Art

Today's world of computer programming offers many high-level programming languages. Java, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks which must be performed by an application programmer, including memory management and cross-platform porting. In this manner, the Java programmer can better focus on design and functionality issues.

One particular JAVA environment is the Java 2 platform, Enterprise Edition (J2EE), which facilitates building Web-based applications. Broadly speaking, J2EE services are performed in the middle tier between the user's browser and the databases and legacy information systems. J2EE comprises a specification, reference implementation and a set of testing suites. J2EE further comprises Enterprise JavaBeans (EJB), JavaServer Pages (JSP), Java servlets, and a plurality of interfaces for linking to information resources in the platform.

The J2EE specifications define how applications should be written for the J2EE environment. Thus the specifications provide the contract between the applications and the J2EE platform. However, there exist a class of JAVA applications that require customization of the J2EE platform. These applications generally utilize application specific strategies created by a particular vendor to accomplish specific tasks that are not provided by the general JAVA platform on which the application executes. Examples of this class of JAVA applications include telecommunications applications and services that are deployed within a particular service provider's environment. This class of applications typically requires continuous availability, which means the environment in which the applications operate requires the applications to be available most of the time.

FIG. 1 is a block diagram showing a prior art J2EE environment 100. The J2EE environment 100 includes a platform 102, which is generally provided by the user of the J2EE environment 100. The platform 102 generally includes the hardware and operating system on which J2EE applications will execute. Present on the platform 102 are an application client container 104, a web container 106, and an enterprise JavaBeans container 108.

Using the J2EE environment 100, application developers can create JAVA applications 110 using EJB, Java servlets, or application clients, which then execute in the appropriate container 104, 106, and 108. An advantage of the J2EE environment 100 is that the applications 110 can be simple since the application developer does not need to be concerned about transactions and other system-level programming concepts. These aspects are handled by the containers 104–108 of the J2EE environment 100.

However, as mentioned above there exist a class of programs that require developers to provide application-specific policies to the applications 110. Unfortunately, the prior art J2EE environment 100 does not allow developers to provide these application-specific polices without breaking the basic JAVA paradigm, which define how a particular application 110 will interact with specific aspects of the underlying platform 102.

Practically speaking, it is difficult to include application-specific policies within a generic Java platform itself because there generally is no prior knowledge of what specific policies any particular application will need. Thus, vendors have individually configured their Java platforms to include application-specific policies 112 that will be needed by the particular programs executing on that particular vendor's platform 102. However, when this type of individual configuration is done, the platform 102 is still unable to execute applications that need application-specific polices that were not built into the particular vendor's platform.

In view of the foregoing, there is a need for systems and methods that allow developers to provide application-specific strategies in the form of Java code for individual JAVA applications. The systems and methods should allow these application-specific strategies to be provided to the underlying Java platform while preserving compatibility with existing Java programming models.

SUMMARY OF THE INVENTION

Broadly speaking, the present invention fills these needs by providing a control module, executed as part of an application, that includes application-specific strategies for the application, yet can be coded using the JAVA programming language. In one embodiment, a system for providing application-specific strategies to a JAVA platform is disclosed. The system includes a runtime subsystem and an application, which includes a control module in communication with the runtime subsystem. The application further includes a plurality of service modules in communication with the control module. The control module includes application-specific policies for the application, which are programmed using a JAVA programming language. The control module manages the service modules, and also is capable of starting a child application by starting a child control module, which is part of the child application.

In another embodiment, a method for starting an application having application-specific strategies in a JAVA environment is disclosed. Initially, a parent control module is provided that includes application-specific policies for a parent application. This parent control module is then used to generate a child control module, which is part of a child application. The child application is then executed using the child control module. More specifically, a request is sent from the parent control module to a runtime executive subsystem, where the request including a message to start the child application. The generated child application control module is used to start a plurality of service modules that are each part of the child application, again by sending a request from the child control module to the runtime executive subsystem, where the request including a message to start a service module. Optionally, the child control module can include the application-specific policies of the parent control module, and both the parent control module and the child control module preferably are programmed using a JAVA programming language.

A method for stopping an application having application-specific strategies in a JAVA environment is disclosed in a further embodiment of the present invention. As in starting an application, the stopping method begins by providing a parent control module that includes application-specific policies for a parent application. The parent control module is then used to stop execution of a child control module that is part of a child application. The execution of the child application is then stopped using the child control module. To initiate the stop sequence a request is sent, from the parent control module to the runtime executive subsystem, that includes a message to stop the child application. The child control module is then used to stop a plurality of service modules that are part of the child application.

Advantageously, the control module of the embodiments of the present invention allows application developers to create and interface code-based application-specific strategies for applications, while keeping the programming model for the service modules compatible with the existing Java platform programming model. The application-specific strategies can include start, stop, load balancing, upgrading, and other code controlled strategies specific to the particular application for which they are designed. Moreover, applications executing on the Java system of the embodiments of the present invention can, in some embodiments, achieve continuous availability, on the order of about 99.9999% uptime or better. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for systems and methods for providing application-specific strategies to a Java platform. To this end, embodiments of the present invention provide a control module, executed as part of an application, that includes application-specific strategies for the application, yet can be coded using the JAVA programming language. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As discussed above, there exist a class of JAVA applications that require customization of the J2EE platform in order to allow for strategies and policies specific to the particular application. An example of such an application is a telecommunication applications, which often require application-specific polices to enable high availability for their services.

The control module of the embodiments of the present invention allows application developers to provide application-specific strategies to their applications without needing to alter the JAVA platform itself, using the JAVA programming language. Thus, developers can define start and stop polices, load balancing policies, upgrade policies, and other application-specific strategies and policies, as will be apparent to those skilled in the art.

Figure 1:
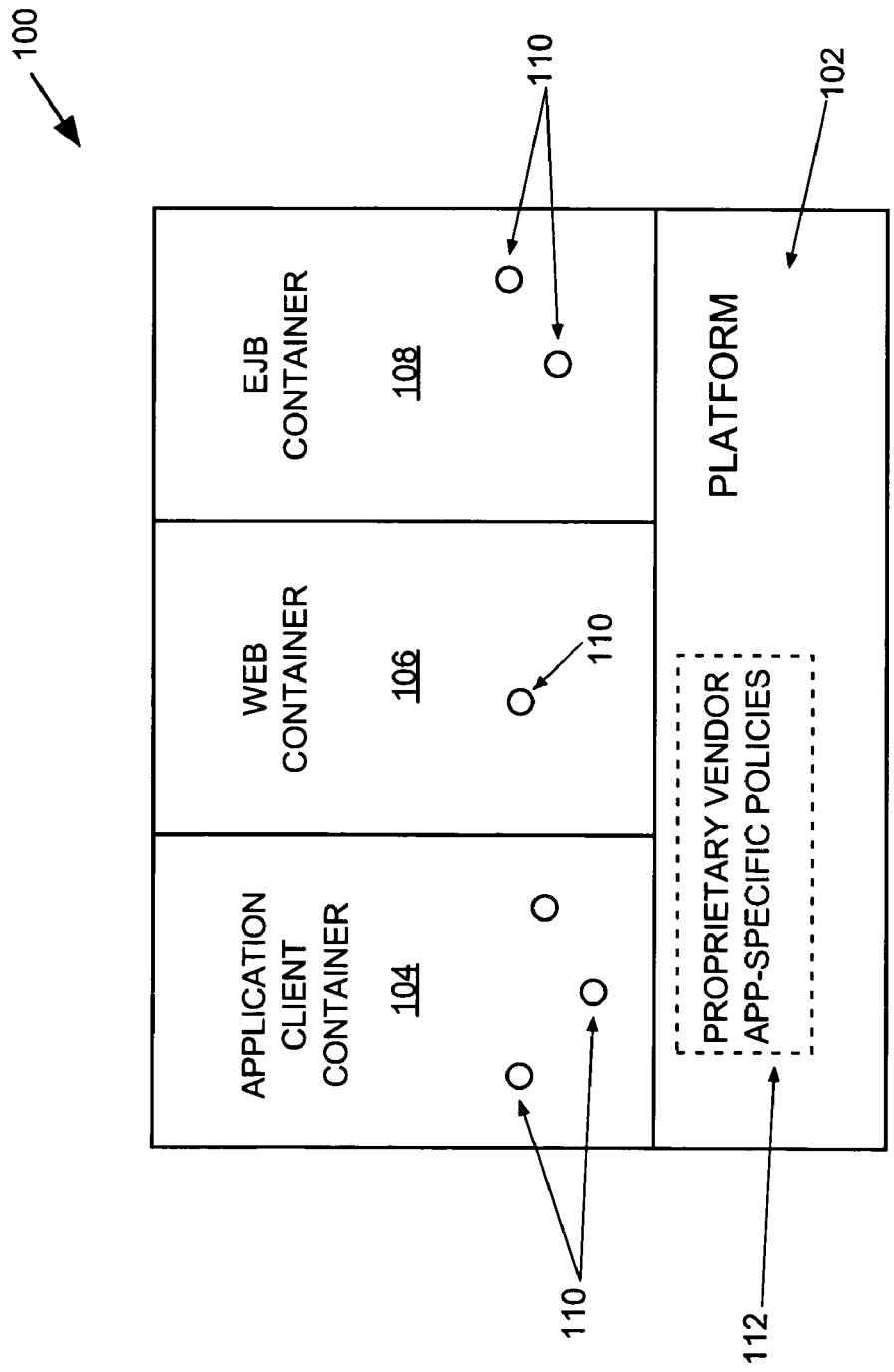
FIG. 1 is a block diagram showing a prior art J2EE environment.
Figure 2:
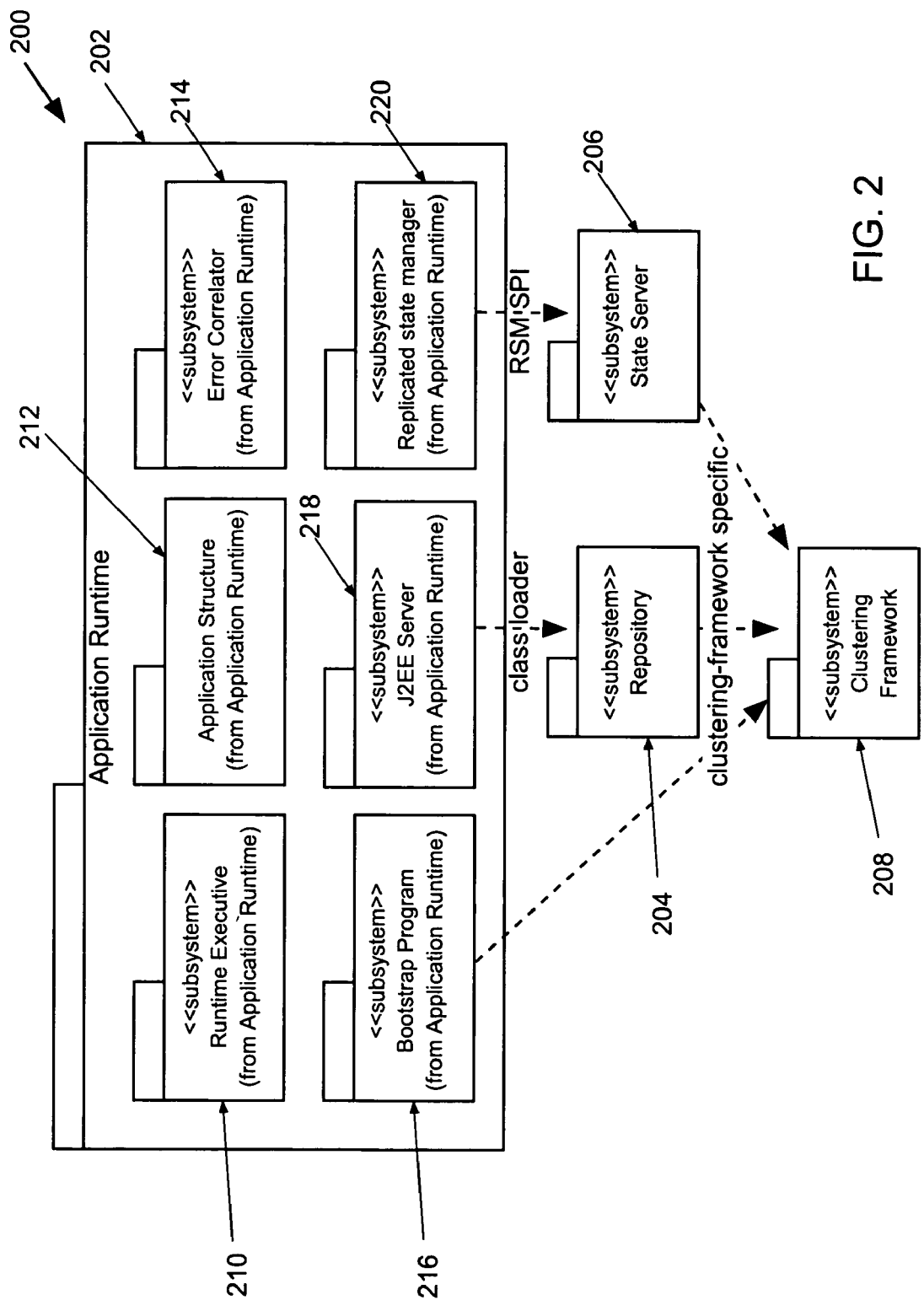
FIG. 2 is a logical diagram of a distributed Java system, in accordance with an embodiment of the present invention.

As will be seen, the control module of the embodiments of the present invention manages the service modules of the applications, and can further generate child applications by starting child control modules for the applications. FIG. 2 is a logical diagram of a distributed Java system 200, in accordance with an embodiment of the present invention. The Java system 200 includes an application runtime subsystem 202, a repository subsystem 204, a state server subsystem 206, and a clustering framework subsystem 208. The distributed Java system 200 supports development of carrier-grade Java applications, and further supports online application upgrades, failure recovery, and load balancing across multiple nodes of a clustered system. Moreover, as will be discussed in greater detail subsequently, applications can supply complex policies for the mechanisms implemented by the Java system 200. Advantageously, applications executing on the Java system 200 can, in some embodiments, achieve continuous availability, on the order of about 99.9999% uptime or better.

As mentioned above, the Java system 200 includes an application runtime subsystem 202, a repository subsystem 204, a state server subsystem 206, and a clustering framework subsystem 208. The repository subsystem 204 is responsible for maintaining class files of applications installed on the system, the class files of the artifacts generated during application deployment, and the class files of the application runtime subsystem 202. The repository depends on the clustering framework subsystem 208 to achieve high availability. The state server subsystem 206 is responsible for storing applications' state information and for making the stored state information highly available to the rest of the system. The clustering framework subsystem 208 represents the underlying high availability cluster framework. Thus, the clustering framework subsystem 208 is the foundation on which the Java system 200 is built.

The application runtime subsystem 202 is responsible for the runtime management and supervision of the Java applications executing on the Java system 200. The application runtime subsystem includes a runtime executive subsystem 210, an application structure 212, an error correlator subsystem 214, a bootstrap subsystem 216, a Java server subsystem 218, and a replicated state manager 220. The runtime executive subsystem 210 is responsible for maintaining the state of the runtime, and coordinates the collaborations among the objects that implement the use cases. The error correlator subsystem 214 processes errors reported from other application runtime components, and further determines which parts of the system are faulty. The bootstrap subsystem 216 is used in bootstrapping the application runtime subsystem 200, and uses the facilities of the clustering framework 208 for this purpose. The Java server subsystem 218 implements the Java containers and other APIs required by the Java platform specification, thus providing the runtime environment for Java applications. The replicated state manager (RSM) 220 implements the management of the recoverable state of Java applications within the Java server 218. The RSM 220 uses the state server 206 to achieve recoverability and availability of an application's state.

Figure 3A:
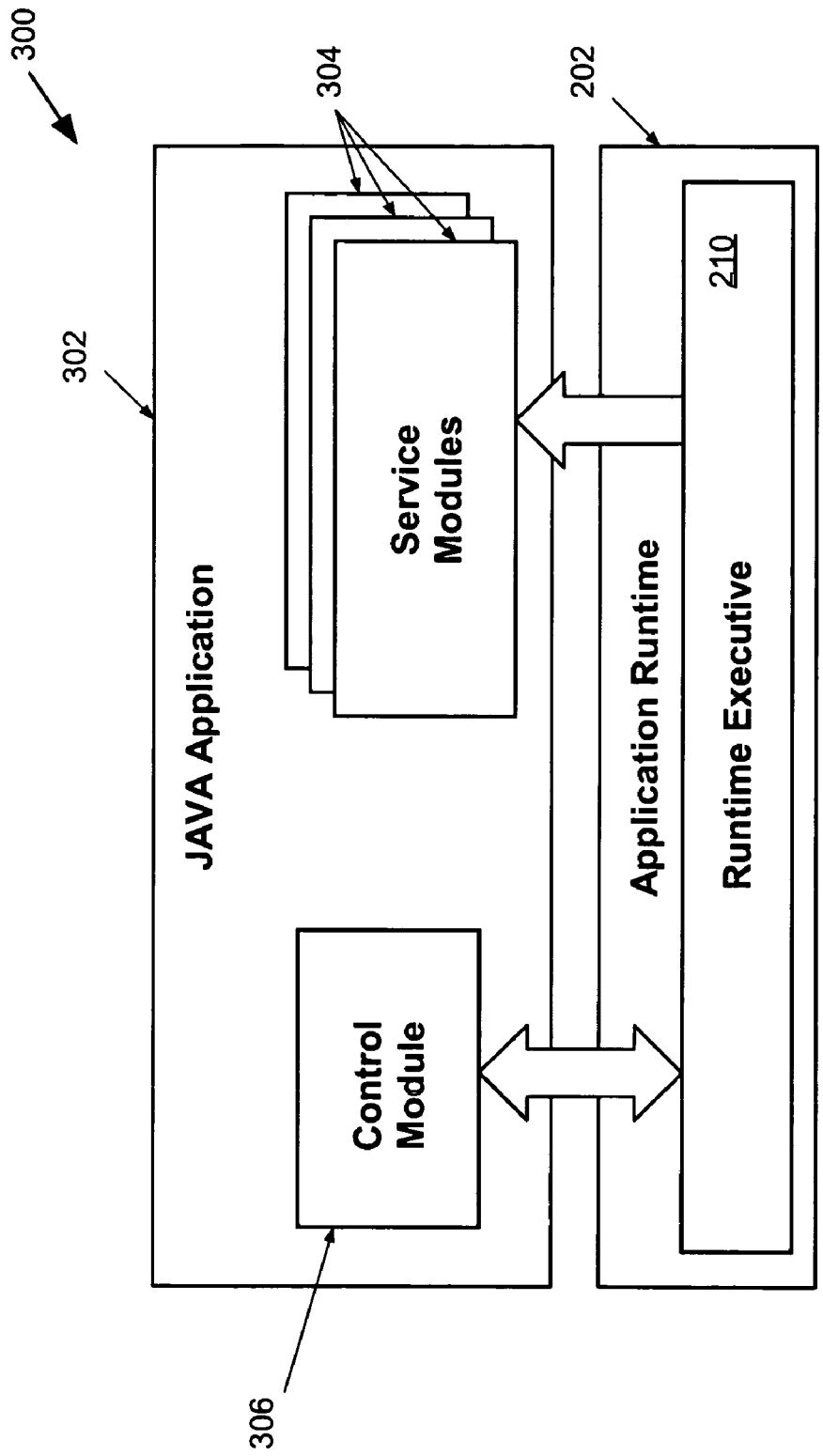
FIG. 3A is a logical diagram showing a Java application execution paradigm, in accordance with an embodiment of the present invention.

FIG. 3A is a logical diagram showing a Java application execution paradigm 300, in accordance with an embodiment of the present invention. The Java application execution paradigm 300 shows a Java application 302 executing in a container under the runtime management and supervision of the application runtime subsystem 202. As mentioned above, the application runtime subsystem 202 includes the runtime executive subsystem 210, which maintains the state of the runtime and coordinates the collaborations among the objects that implement the use cases.

The Java application 302 includes service modules 304 and a control module 306. The service modules 304 are program modules that include the actual code for the application 302, and are generally written as Enterprise JavaBeans, Servlets, or Java Server Pages. The Enterprise JavaBeans (EJBs), Servlets, and Java Server Page implement the actual service logic of the application. The service modules 304 are managed by the runtime executive 210, which determines when and where to execute the service modules 304.

Collaborating with the runtime executive subsystem 210 is the control module 306, which is a code module that includes application-specific policies for the Java application 302. The application-specific policies included in the control module 306 can include policies for application start, application stop, application upgrade, application load balancing, and application failure recovery. To perform these policies, the control module 306 supervises the life cycle of the service modules 304 of the application 302, child applications, and the Java servers by collaborating with the runtime executive subsystem 210. As discussed in greater detail next with reference to FIG. 3B, the application 302 can provide the control module 306, or the application 306 can use a generic control module 306, which the JAVA platform provides.

Figure 3B:
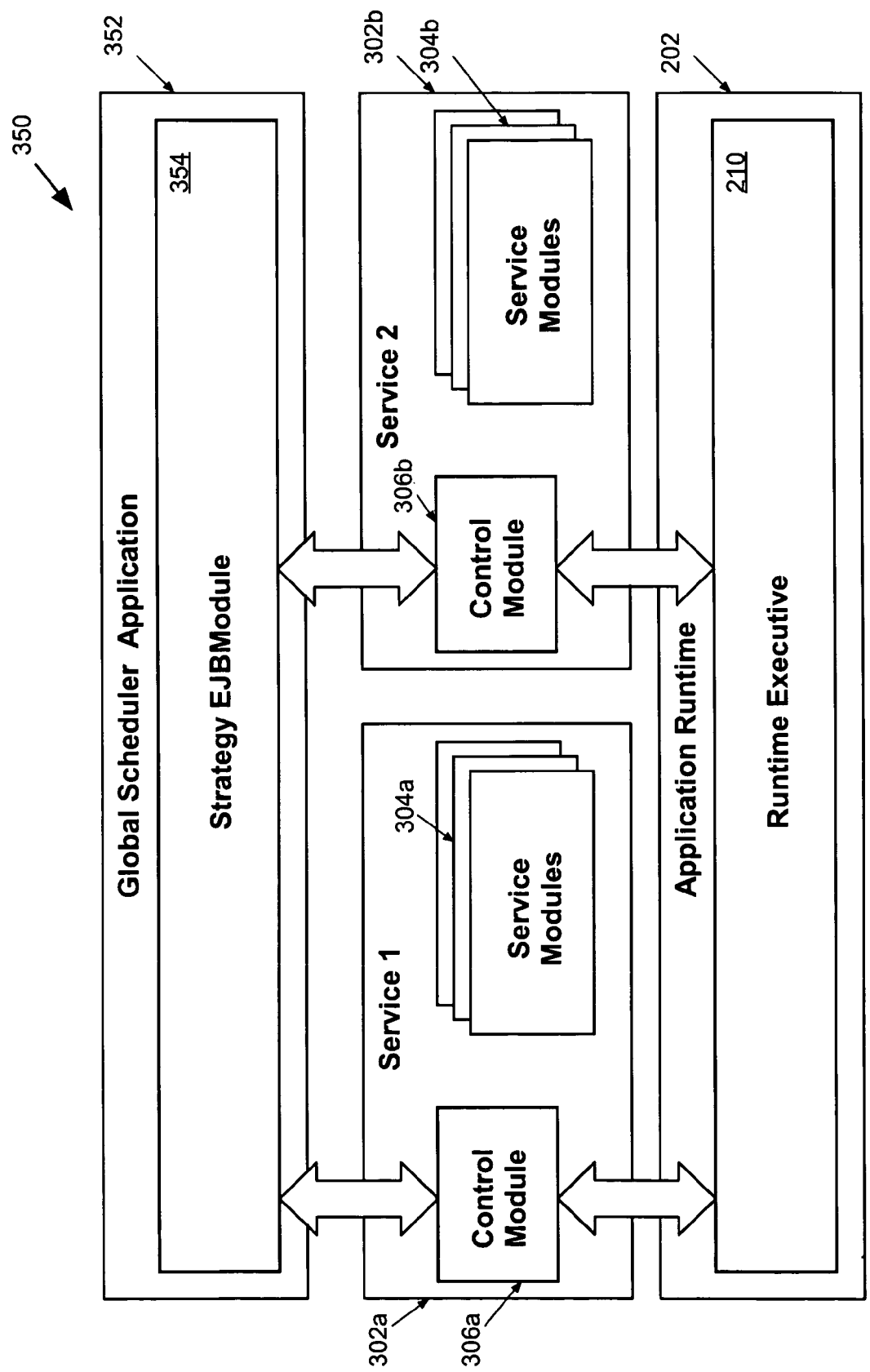
FIG. 3B is a logical diagram showing a Java application execution paradigm wherein generic control modules are injected into Java applications, in accordance with an embodiment of the present invention.

FIG. 3B is a logical diagram showing a Java application execution paradigm 350 wherein generic control modules are injected into Java applications, in accordance with an embodiment of the present invention. FIG. 3B shows two Java applications 302a and 302b executing in a container under the runtime management and supervision of the application runtime subsystem 202. As mentioned above, the application runtime subsystem 202 includes the runtime executive subsystem 210, which maintains the state of the runtime and coordinates the collaborations among the objects that implement the system.

FIG. 3B further shows a global scheduler application 352 having a strategy Enterprise JavaBeans module 354. Here, the application runtime subsystem 202 includes generic implementations of control modules 306a and 306b that are used for applications 302a and 302b, which do not provide custom control modules of their own. The global scheduler application 352 and strategy Enterprise JavaBeans module 354 provide the global scheduling and the application strategies and policies for both Java applications 302a and 302b. In particular, the global scheduler application 352 and strategy Enterprise JavaBeans module 354 ensure the control modules 306a and 306b cooperate such that they do not interfere with each other, for example by executing each application 302a and 302b on a separate node. Thus, the embodiments of the present invention are able to provide platform independent application-specific policies and strategies for both applications having custom policies designed by the developer, and for applications that do not have custom policies.

Figure 4:
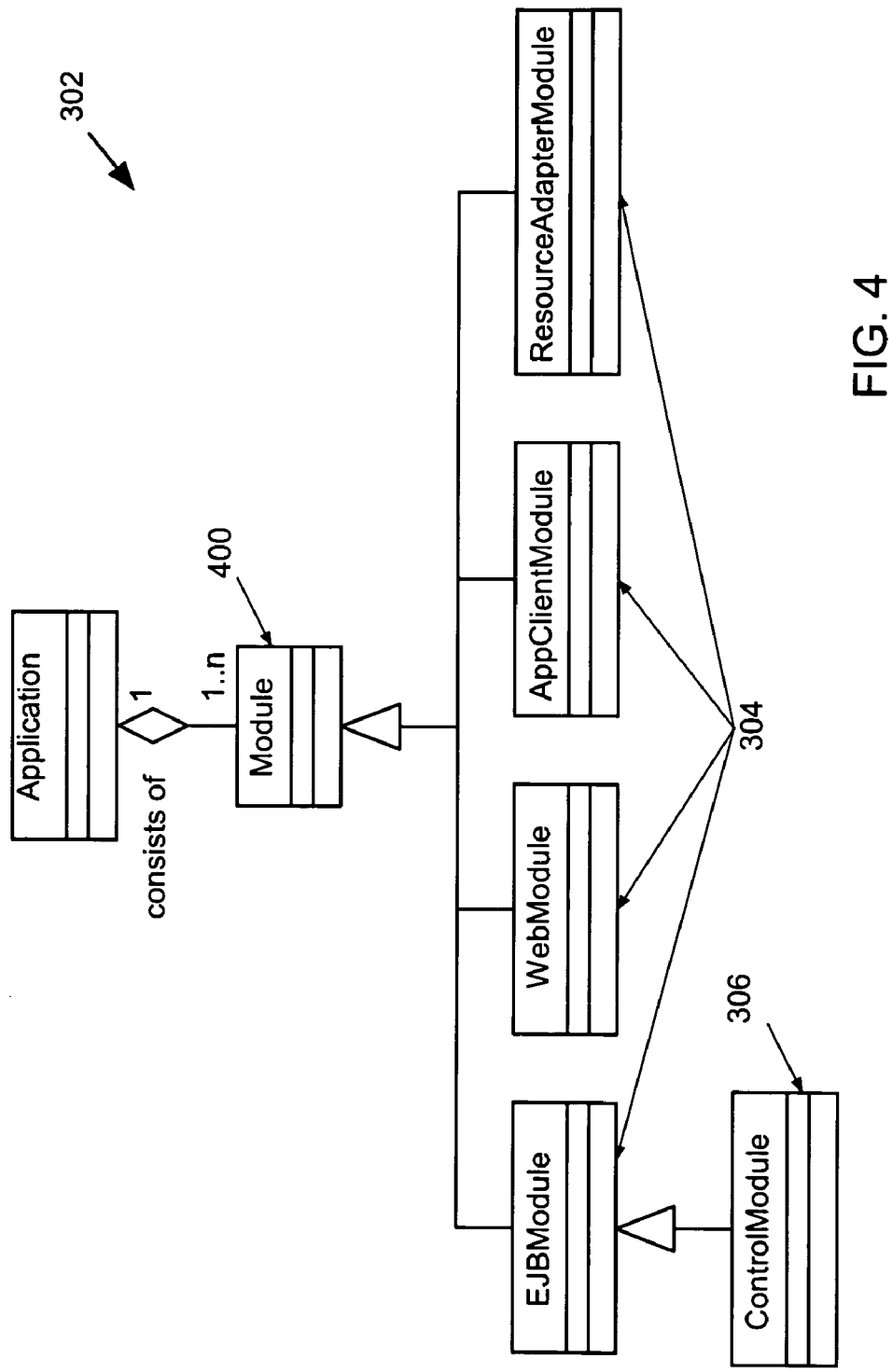
FIG. 4 is structural diagram of a Java application, in accordance with an embodiment of the present invention.

FIG. 4 is structural diagram of a Java application 302, in accordance with an embodiment of the present invention. As shown in FIG. 4, a Java application 302 comprises one or modules 400, which provide the functionality for the application 302. Each module 400 can be any one of several service module 304 types, such as an Enterprise JavaBean module, a Web module, an Application Client module, or a Resource Adapter module. In addition, a module 400 of an application 302 can be a control module 306, which is a particular type of Enterprise JavaBean module.

In addition to performing the operations discussed previously, the control module 306 can communicate with the control modules 306 of other applications using EJB invocations or other communication API supported by the Java platform. By communicating with each other, the control modules 306 of related applications can coordinate the policies for multiple applications (e.g. perform load-balancing of multiple applications). In addition, the control module 306 can communicate with the application's 302 service modules 304 using EJB invocations or other communication API supported by the Java platform. By communicating with the service modules, the control modules can affect the functions of the service modules. Moreover, the control module 306 can communicate with external applications. An external application can thereby affect the supervision of application's modules. Further the control module 306 can use its recoverable EJB CMP state, because a Control Module 306 is an EJB Module, which the system manages in a highly available manner.

Figure 5:
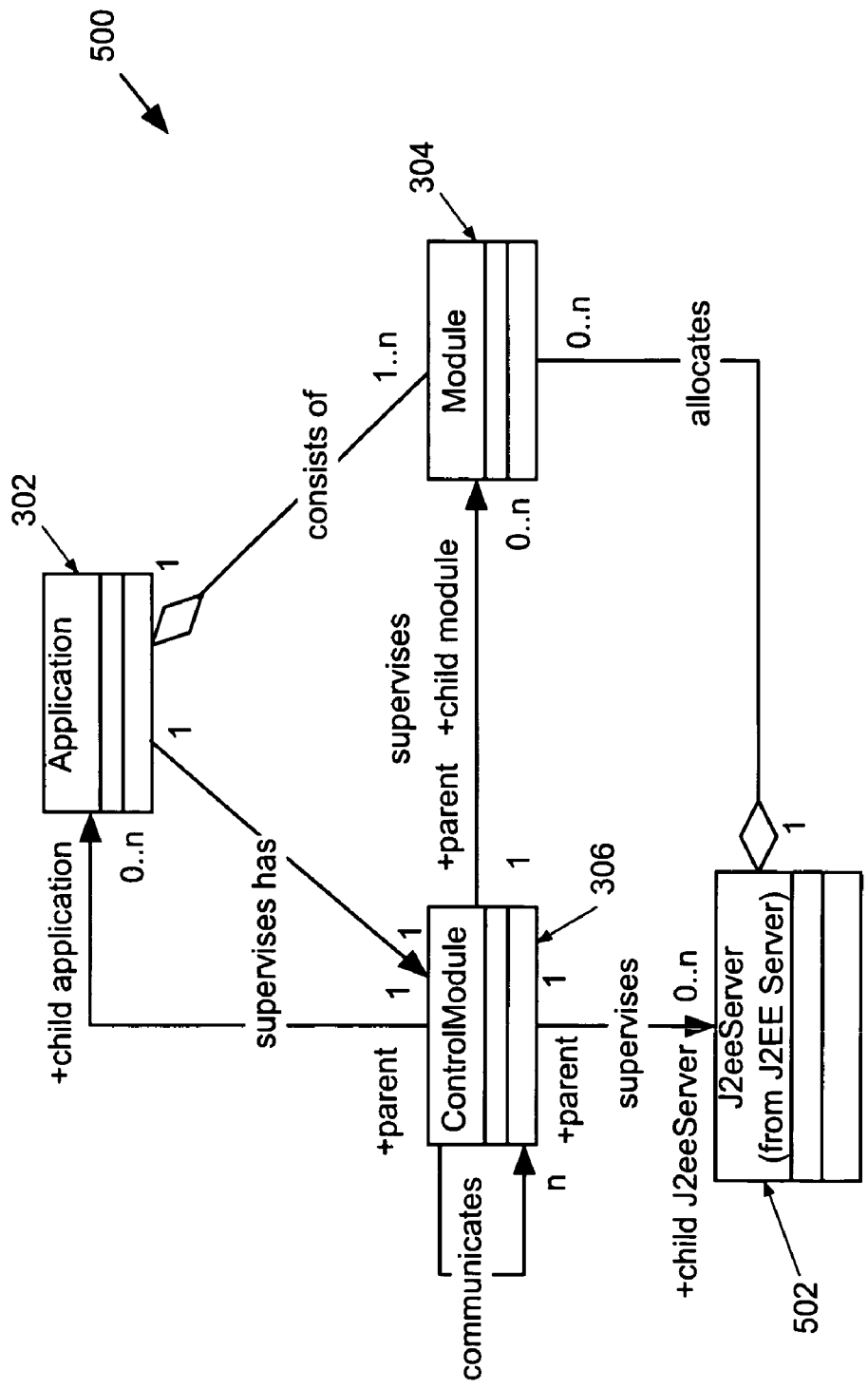
FIG. 5 is a logical diagram showing an application-server relationship, in accordance with an embodiment of the present invention.

FIG. 5 is a logical diagram showing an application-server relationship 500, in accordance with an embodiment of the present invention. As shown in FIG. 5, an application 302 includes a control module 306 and one or more service modules 304, which are each allocated to a server process 502. In operation, each module has a parent module that supervises the module, including starting, stopping, and supervising upgrades of the module. In the embodiments of the present invention, the control module 306 is the parent module of the service modules 304 of the application 302. Thus, the control module 306 starts each service module 304 and allocates the service module to a server process 502. In addition, a control module 306 can start a child application 302 by starting a control module 306 for that child application 302.

Figure 6:
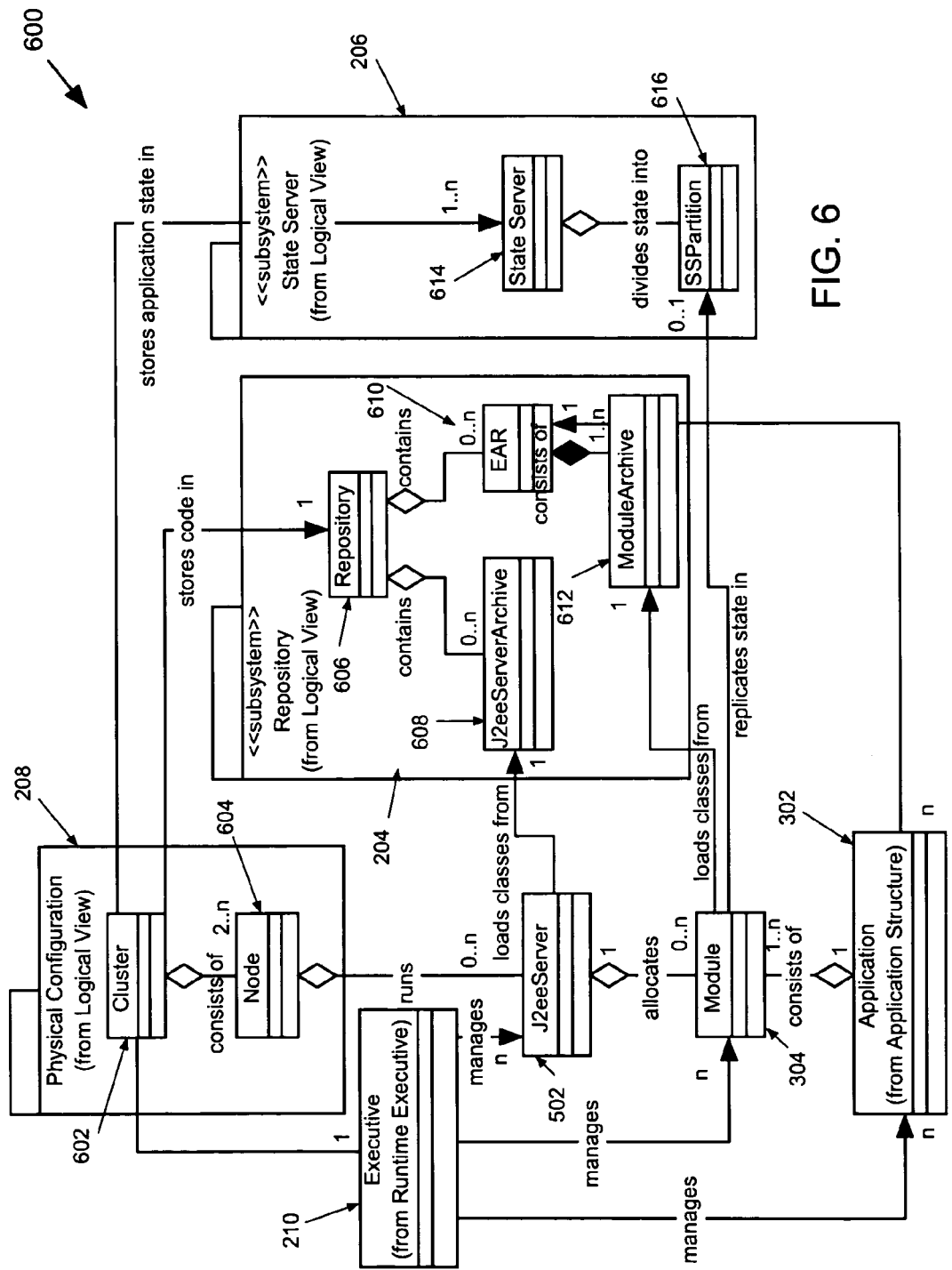
FIG. 6 is an architectural diagram showing class structure for a Java system, in accordance with an embodiment of the present invention.

FIG. 6 is an architectural diagram showing class structure for a Java system 600, in accordance with an embodiment of the present invention. The Java system 600 includes an application runtime having four main classes: Executive 210, J2EE Server 502, Application 302, and Module 304. Objects from these classes execute over a physical configuration 208 of a cluster 602 comprising several nodes 604 to form a distributed computer system. Typically, the Java system 600 has one Executive object 210, and each node 604 in the cluster 602 runs zero or more J2EE Servers 502, which can be a UNIX process running a Java virtual machine (JVM) with the J2EE runtime classes.

As shown in FIG. 6, each application object 302 comprises of one or more modules 304, which generally are the smallest unit for the purposes of runtime supervision in the Java system 600. Each Module 304 preferably is allocated to a single J2EE server 502, however a J2EE Server 502 can allocate multiple modules 304.

The executive 210 manages the application 302, module 304, and J2EE server 502 objects. The management includes the orchestration of the use cases, such as start, stop, and upgrade of the Java system 600 and applications, handling failures of the application 302, module 304, and J2EE server 502 objects. The executive 210 also performs load balancing across the J2EE servers 502 and nodes 604 in the cluster 602. In operation, the class files of an application's modules 304 are loaded from a single EAR 610 file in the repository 204. In particular, the class files of each module 304 are loaded from a single module archive 612.

In addition, a module 304 may have a recoverable state managed by the Replicate State Manager (RSM), which is integrated into the J2EE server 502. The recoverable state includes the state of EJB CMP enterprise beans and the persistent message sent by the bean but not processed yet by the recipients. If a module 304 has a recoverable state, the recoverable state is replicated in a SSPartition object 616 in the state server 614.

The class files of a J2EE server 502 are loaded from a J2EE server archive 608 in the repository 204. In general, the system 600 includes a single repository 204 and one or more state servers 614, however, other embodiments can include multiple repositories 204 depending on the particular system requirements. Multiple state servers 614 are used to provide support for different state management policies, and to achieve performance scalability by running multiple state server 614 instances.

Figure 7:
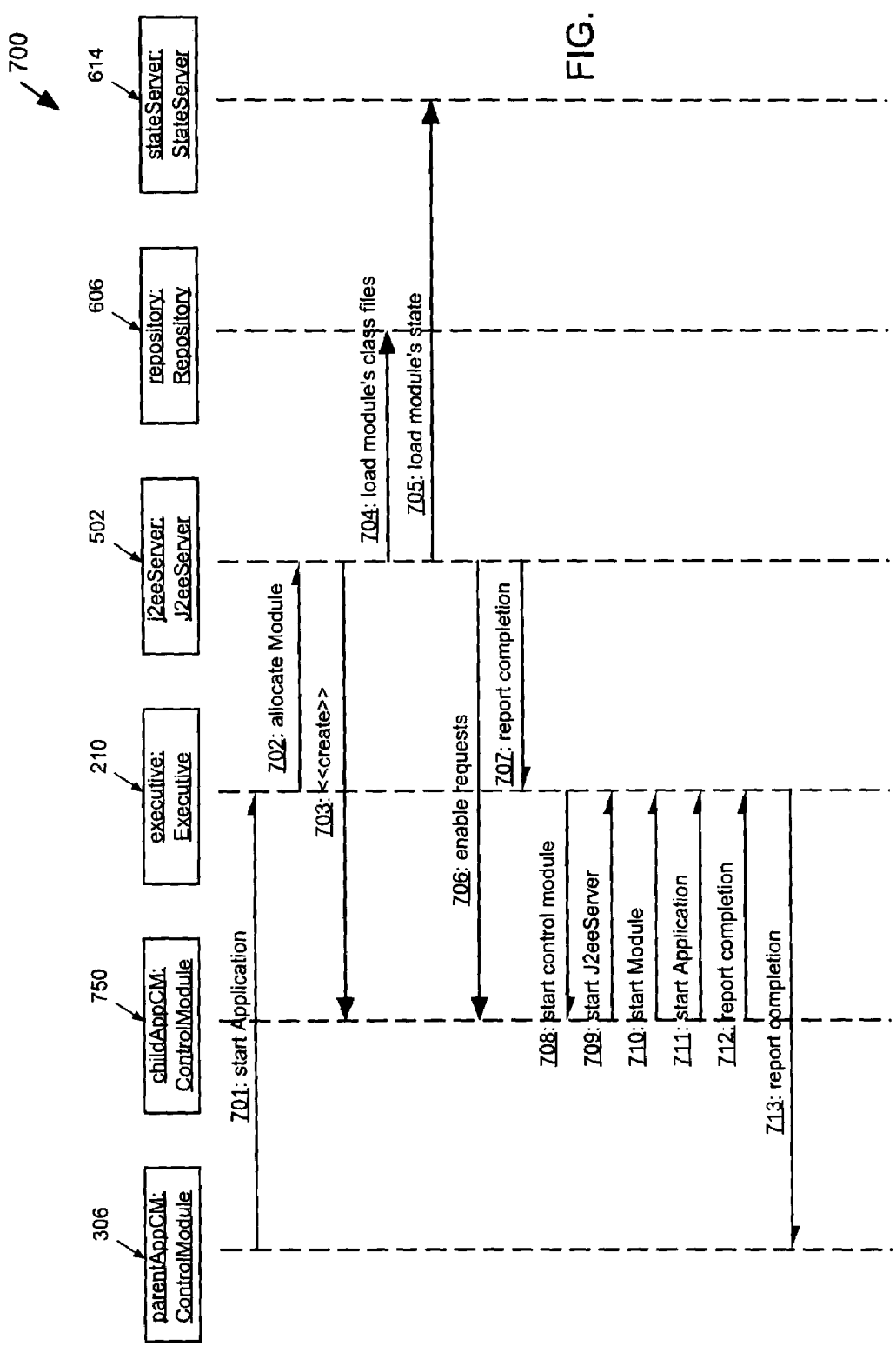
FIG. 7 is a sequence diagram showing an application start sequence, in accordance with an embodiment of the present invention.

As previously mentioned, the control module 306 of the embodiments of the present invention can be used to manage other aspects of an application, including starting, stopping, and load balancing multiple child applications and modules. FIG. 7 is a sequence diagram showing an application start sequence 700, in accordance with an embodiment of the present invention. The application start sequence 700 shows the interaction between a parent application control module 306, a child application control module 750, a runtime executive 210, a J2EE Server 502, a repository 606, and a state server 614.

The application start sequence 700 illustrates how a parent application's control module 306 initiates the start of a child application by creating the child application's control module 750. Broadly speaking, the parent applications control module 306 allocates the child application's control module 750 to a specified J2EE server 502. The child application's control module 750 then coordinates the remainder of the child application's start up.

In operation 701, the parent application's control module 306 requests the executive 210 to start a child application. The request includes the J2EE server 502 in which the executive 210 should allocate the child application's control module 750. The request may also include optional application-specific data to be passed to the child application's control module.

The executive 210 then requests the J2EE server 502 to allocate the child application's control module 750, in operation 702. The J2EE server 502 then creates the child application's control module 750 and allocates the data structures that the J2EE server 502 needs to manage the child control module 750 at runtime, in operation 703. In addition, the J2EE server 502 loads the child application's control module 750 class files from the repository 606 into J2EE Server 502 memory, in operation 704.

In operation 705, the J2EE Server 502 loads the child application's control module 750 recoverable state from the State Server 614 into the J2EE Server 502 memory. The J2EE Server 502 then enables routing of incoming messages to child application's control module 750, in operation 706. After enabling routing of income messages to the child control module 750, other application modules can communicate with child application's control module 750. Then, in operation 707, the J2EE Server 502 reports completion of module allocation to the executive 210.

In operation 708, the executive 210 requests the child application's control module 750 to start the rest of the child application, which includes starting the child application's service modules, J2EE Servers, and child applications. The request can also include the application-specific data passed from parent application's control module 306.

The child application's control module 750 then starts zero or more child J2EE Servers, in operation 709, using the Start J2EE Server sequence, discussed subsequently with respect to FIG. 9. The child application's control module 750 starts zero or more service modules, in operation 710, using the Start Module sequence, discussed below with respect to FIG. 8. It should be noted that the child application's control module 750 may start the same service module multiple times and spread the instances across multiple J2EE Servers 502 and nodes to scale up the service module's throughput. In operation 711, the child application's control module 750 starts zero or more child applications using the Start Application sequence 700. The child application's control module 750 then reports completion to the executive 210, in operation 712. The completion message may include optional application-specific data that child application's control module 750 wants to pass to parent application's control module 306. The executive 210 then reports completion to parent application's control module 306. This completion message preferably includes the application-specific data passed from child application's control module 750 in operation 712.

In other embodiments of the present invention, the child application's control module 750 can report completion of "start children" before it starts up its child modules, J2EE Servers, and applications. Thus, operations 712 and 713 can occur before operations 709, 710, and 711, or concurrently with them. In addition, the child application's control module 750 can perform operations 709, 710, and 711 in any order, and can perform them concurrently. Further, in operation 705, the child application's control module 750 may load only a part of its recoverable state from the State Server 614. The remaining parts can then be loaded when the child application's control module 750 needs them for computation.

Figure 8:
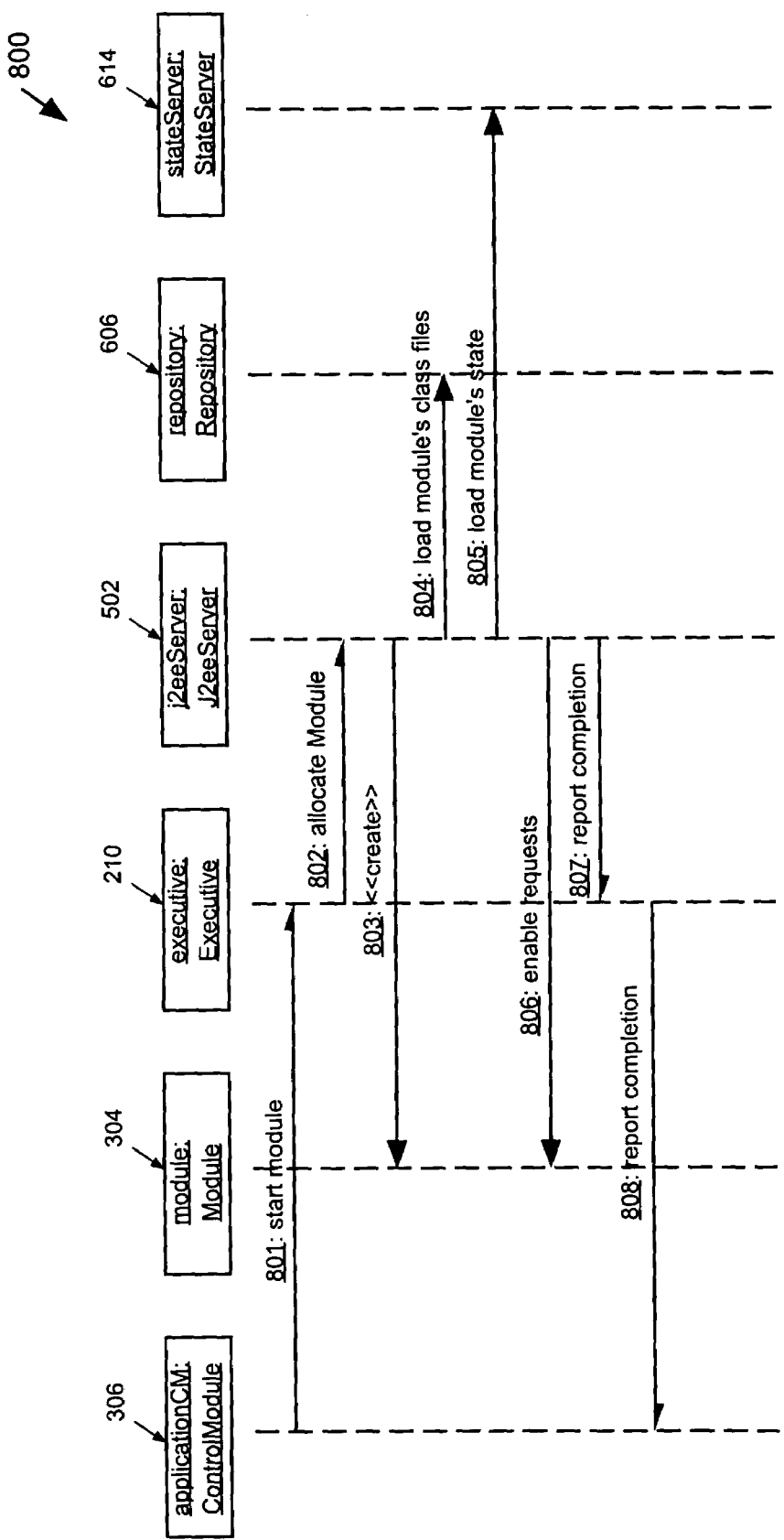
FIG. 8 is a sequence diagram showing a module start sequence, in accordance with an embodiment of the present invention.

FIG. 8 is a sequence diagram showing a module start sequence 800, in accordance with an embodiment of the present invention. The module start sequence 800 shows the interaction between a control module 306, a service module 304, a runtime executive 210, a J2EE Server 502, a repository 606, and a state server 614. In particular, the module start sequence 800 illustrates how an application's control module 306 starts a service module 304 and allocates the service module 304 to a specified J2EE server 502.

In operation 801, the application's control module 306 requests the executive 210 to start a module 304. Preferably, the request specifies a particular J2EE Server 502 in which the module 304 should be allocated. The executive 210 then requests J2EE Server 502 to allocate the module 304, in operation 802.

In operation, 803, the J2EE Server 502 creates the module 304 and allocates the data structures that the J2EE server 502 needs to manage the module 304 at runtime, and loads the module's class files from repository 606 into its memory in operation 804. In operation 805, J2EE Server 502 loads the module's recoverable state from State Server 614 into the J2EE Server memory, and enables routing of incoming messages to the module 304, in operation 806. After enabling the routing of incoming messages to the module 304, other application modules and external applications can communicate with the module. The J2EE Server 502 then reports completion of module allocation to the executive 210 in operation 807, and the executive 210 reports completion to control module 306, in operation 808.

Figure 9:
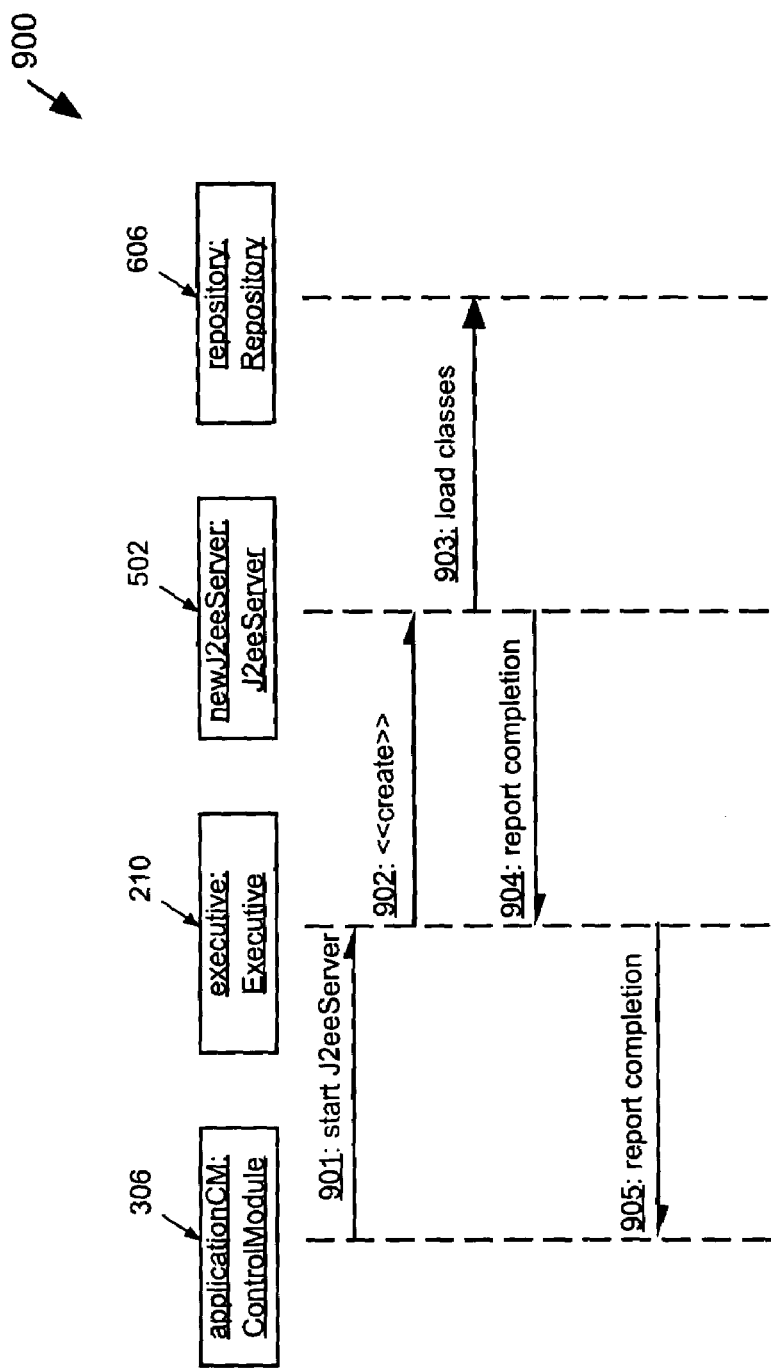
FIG. 9 is a sequence diagram showing a J2EE server start sequence, in accordance with an embodiment of the present invention.

FIG. 9 is a sequence diagram showing a J2EE server start sequence 900, in accordance with an embodiment of the present invention. The J2EE server start sequence 900 shows the interaction between a control module 306, a runtime executive 210, a J2EE Server 502, and a repository 606. In particular, the J2EE server start sequence 900 illustrates how an application's control module 306 starts a new J2EE server process 502 on a specified node.

In operation 901, the control module 306 requests the executive 210 to start a J2EE Server 502. Generally, the request specifies the node on which to start the J2EE Server 502, and the version of the J2EE Server 502. Then, in operation 902, the executive 210 creates the new J2EE Server 502 on the specified node and requests the J2EE server 502 to initialize itself. In response, the J2EE server 502 loads its class files from the J2EE Server Archive in the Repository 606, in operation 903.

The J2EE server 502 then reports completion of its initialization to the executive 210, in operation 904, and the executive reports completion to control module, in operation 905. Since the creation of a new J2EE Server 502 can be CPU intensive, the implementation preferably ensures that the creation of a new J2EE Server 502 is performed at a lower priority than the processing of normal application-level requests by existing J2EE Servers on the same node.

Figure 10A:
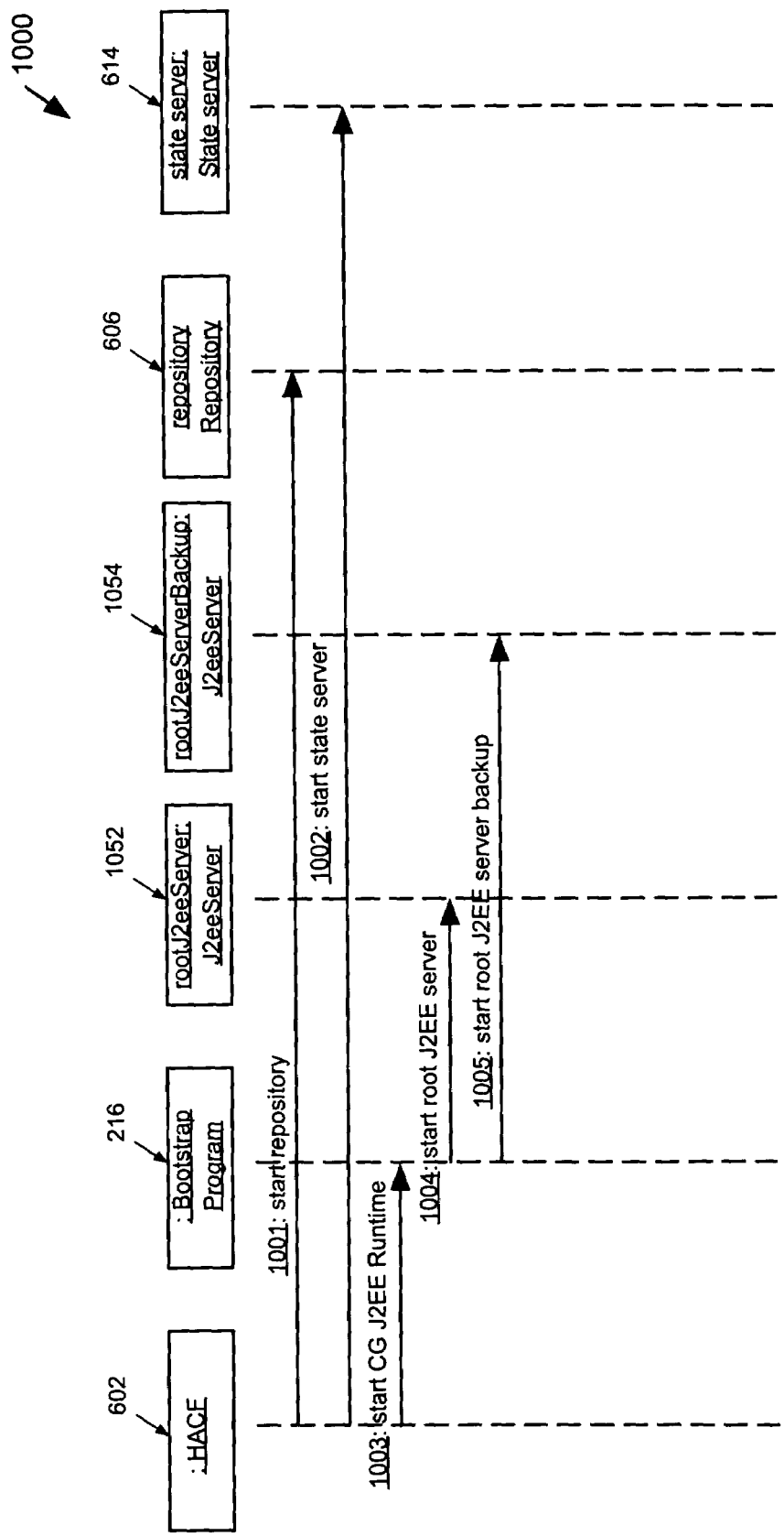
FIGS. 10A and 10B are sequence diagrams showing a J2EE system start sequence, in accordance with an embodiment of the present invention.
Figure 10B:
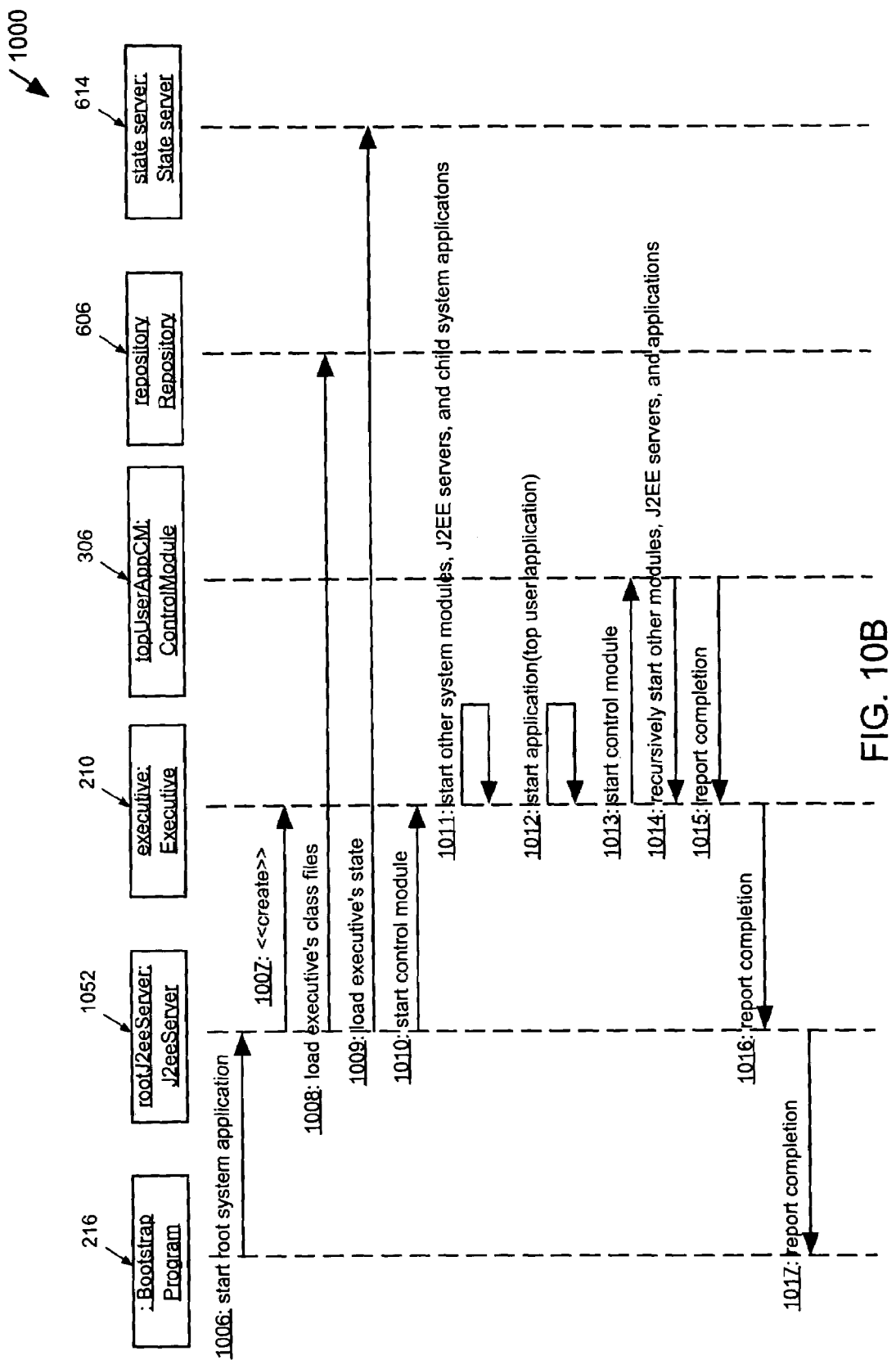

FIGS. 10A and 10B are sequence diagrams showing a J2EE system start sequence 1000, in accordance with an embodiment of the present invention. The J2EE system start sequence 1000 illustrates the start up sequence of the J2EE system. Broadly speaking, an underlying Clustering Framework 602 starts a bootstrap program 216, which then creates the root J2EE server process 1052 on one node and a backup server process 1054 on another node. The bootstrap program 216 then requests the root J2EE Server 1052 to create a root system application by creating its control module 306. The executive 210 then starts other system modules and applications. Then, the executive 210 starts a Top User Application, which recursively starts up other user applications.

Initially, in operation 1001, the underlying Clustering Framework 602 starts the repository 606. In one embodiment, the repository 606 is implemented as a high availability service within the Clustering Framework 602. In operation 1002, the Clustering Framework 602 starts the state server 614, and, if there are multiple state servers 614, all state servers 614 are started. As with the repository, in some embodiments of the present invention, the state server 614 is implemented as a high availability service within the Clustering Framework 602. Then, in operation 1003, the Clustering Framework 602 starts an instance of the bootstrap program 216.

In operation 1004, the bootstrap program 216 starts a root J2EE Server 1052 process using an extension of the J2EE Server start sequence 900. In addition, in operation 1005, the bootstrap program 216 uses an extension of the J2EE Server start sequence 900 to start a root J2EE Server Backup 1054 process. Then, in operation 1006, the bootstrap program 216 requests root J2EE Server 1052 to start the root system application. The Root J2EE Server 1052 then starts the root system application by allocating the control module, which is the module implementing the executive 210, in operation 1008. After starting the root system application, the Root J2ee Server 1052 loads the executive's class files from the repository 606, in operation 1009, and, in operation 1010, the Root J2EE Server 1052 loads the executive's recoverable state from the state server 614.

In operation 1011, the Root J2EE Server 1052 requests the executive 210 to start the root system application. It should be noted that the executive 210 functions as the control module for the root system application. In response, the executive 210 requests itself to start the root system application's other modules, J2EE servers, and child system applications using the module start sequence 800, J2EE Server start sequence 900, and application start sequence 700, in operation 1011. In this capacity, the executive 210 functions as the parent control module in these start sequences.

The executive 210 also requests itself to start the top user application, in operation 1012, using the application start sequence 700, and acts as the parent control module in this use case. In response, the executive 210 allocates the top user application's control module 306 and requests the control module 306 to the start the top user application, in operation 1013.

In operation 14, the top application's control module 306 starts other modules, J2EE Servers, and child applications. Starting of child applications leads to recursion, which results in starting all J2EE applications. Then, in operation 1015, the top user application's control module 306 reports completion of the start children request to the executive 210. In response, the executive 210 reports completion to the root J2EE server 1052, in operation 1016, and, in operation 1017, the root system application's control module reports completion to the root J2EE server.

Figure 11:
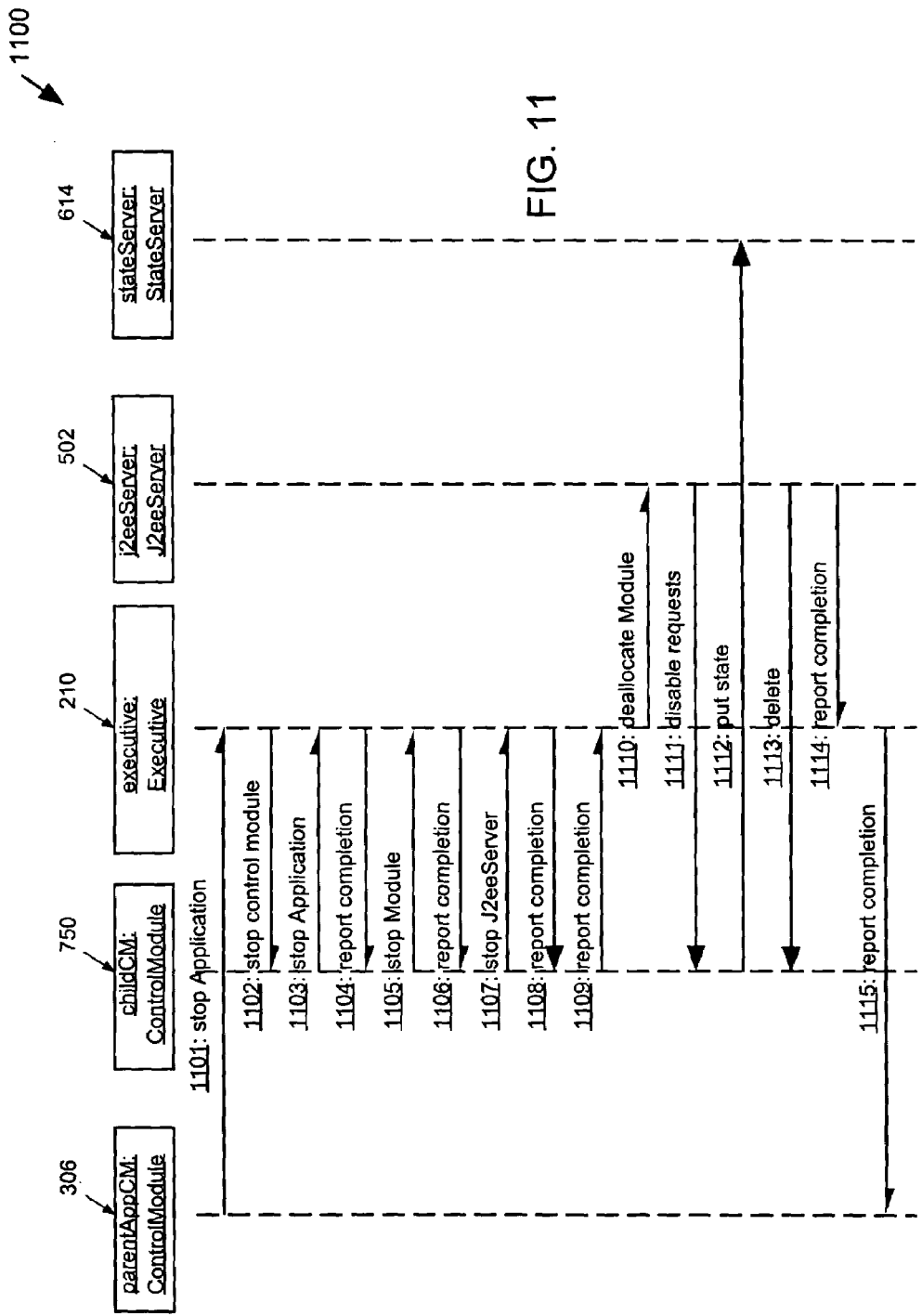
FIG. 11 is a sequencing diagram showing an application stop sequence, in accordance with an embodiment of the present invention.

FIGS. 11–14 illustrate stop sequences used by control modules of the embodiments of the present invention. In particular, FIG. 11 is a sequencing diagram showing an application stop sequence 1100, in accordance with an embodiment of the present invention. The application stop sequence 1100 illustrates how a parent application's control module 306 stops a child application by requesting to stop the child application's control module 750. The child application's control module 750 stops the application's service modules 304 and child applications.

In operation 1101, the parent application's control module 306 requests the executive 210 to stop a child application. In response to the request, the executive 210 sends a stop control module request to the child application's control module 750, in operation 1102. Next, in operation 1103, the child application's control module 750 requests the executive 210 to stop its child application. The child application's control module 750 repeats this step for all its child applications by recursively applying the application stop sequence 1100. When the child applications of the child application's control module 750 are stopped, the executive reports completion of the request, in operation 1104.

The child application's control module 750 then requests the executive to stop a service module, in operation 1105. The child application's control module 750 repeats this request for all the application's service modules, using the module stop sequence 1200 discussed subsequently with reference to FIG. 12. When the executive 210 completes the requests, in operation 1106, the executive 210 reports completion of the requests initiated in operation 1105. The child application's control module 750 then, in operation 1107, requests the executive 210 to stop a J2EE Server 502, and repeats this operation for all its child J2EE Servers 502 using the J2EE Server stop sequence 1300 discussed below with reference to FIG. 13. The executive reports completion of the stop J2EE server requests in operation 1108. In response, the child application's control module 750 reports the completion of the stop control module request to the executive 210.

Next, in operation 1110, the executive 210 requests the J2EE Server 502 running the child application's control module 750 to deallocate the child application's control module 750. In response, the J2EE Server 502 disables child application's control module 750 from receiving new requests, in operation 1111. In addition, the J2EE Server 502 writes any unsaved recoverable state of child application's control module 750 to the state server 614, in operation 1112. Then, in operation 1113, the J2EE Server deletes child application's control module 750. Once the control module 750 is deleted, the J2EE Server 502 reports completion to the executive 210, in operation 1114, and the executive 210 reports completion to the parent application's control module 306, in operation 1115.

Figure 12:
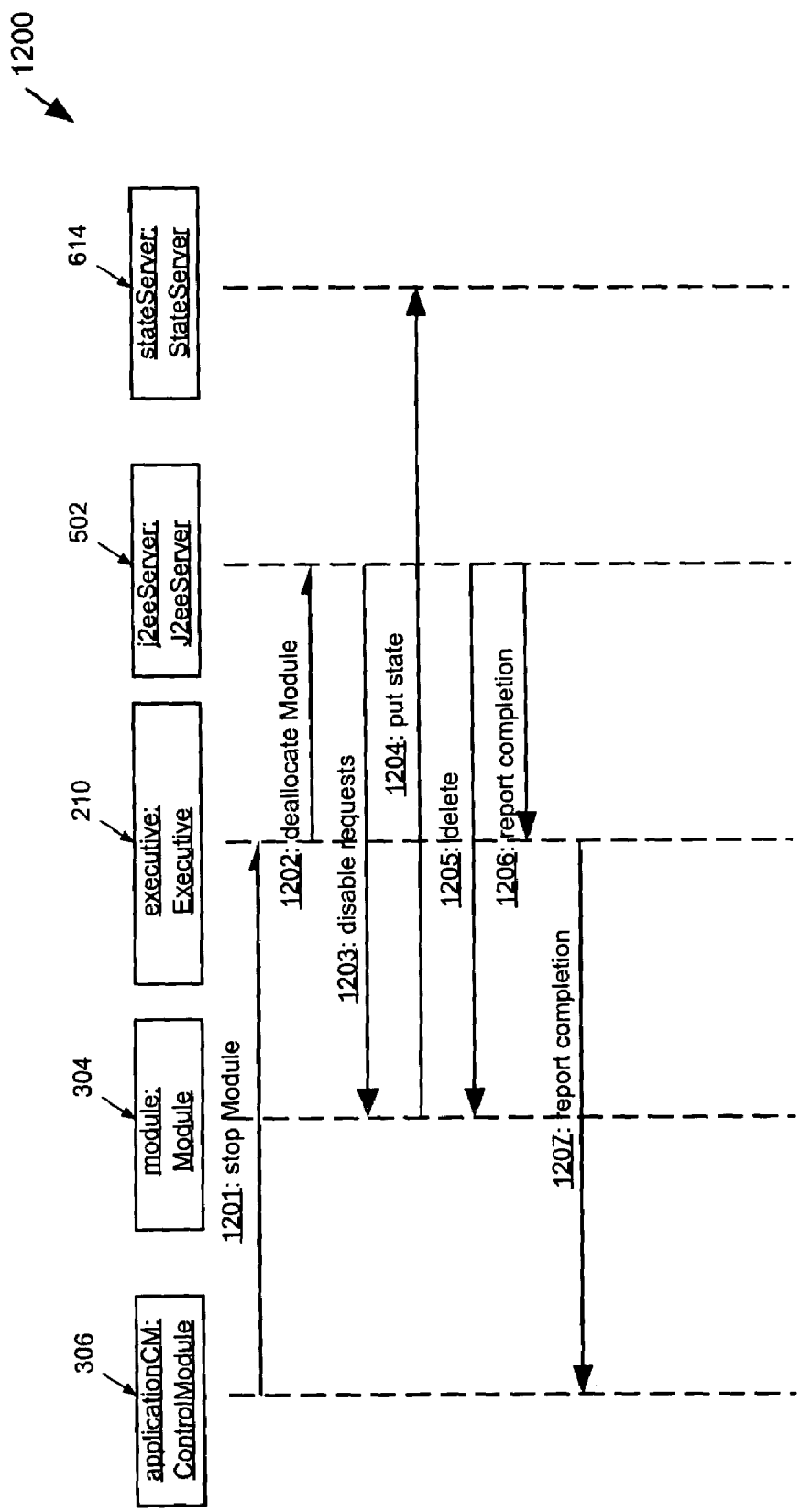
FIG. 12 is a sequencing diagram showing a module stop sequence, in accordance with an embodiment of the present invention.

FIG. 12 is a sequencing diagram showing a module stop sequence 1200, in accordance with an embodiment of the present invention. The module stop sequence 1200 illustrates how an application's control module 306 stops a service module 304. Initially, in operation 1201, the control module 306 requests the executive 210 to stop a service module 304. In response, the executive 210 requests the J2EE Server 502 running the module 304 to deallocate the module 304, in operation 1202.

The J2EE Server 502 then disables the module 304 from receiving new requests, in operation 1203, and writes any unsaved recoverable state of the module to the state server 614, in operation 1204. The J2EE Server 502 then deletes the module from its memory, in operation 1205. In operation 1206, the J2EE Server reports completion to the executive 210, and then the executive reports completion to the control module 306, in operation 1207.

Figure 13:
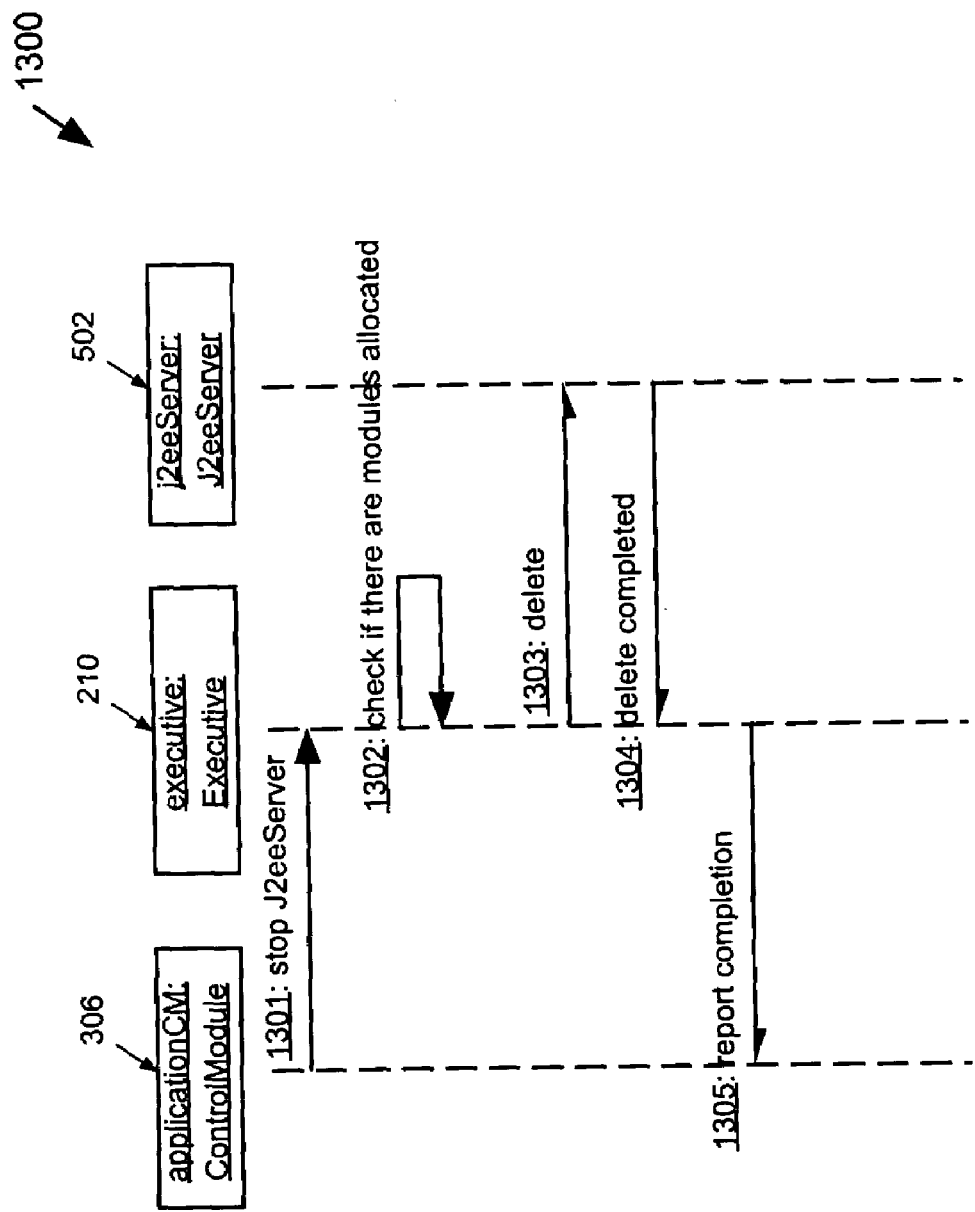
FIG. 13 is a sequencing diagram showing a J2EE server stop sequence, in accordance with an embodiment of the present invention.

FIG. 13 is a sequencing diagram showing a J2EE server stop sequence 1300, in accordance with an embodiment of the present invention. The J2EE server stop sequence 1300 illustrates how an application's control module 306 stops a J2EE server process 502. Initially, in operation 1301, the control module 306 that started J2EE Server 502 requests the executive 210 to stop J2EE Server 502. Then, in operation 1302, the executive 210 checks whether there are any modules allocated to the J2EE Server 502. If there are any modules allocated to J2EE Server 502, the executive 210 reports an error to the control module 306.

If there are no modules allocated to the J2EE Server 502, the executive 210 requests J2EE Server 502 to delete itself by freeing all resources and exiting, in operation 1303. The completion of the delete request is then reported to the executive 210, in operation 1304, and the executive 210 reports completion to the control module 306, in operation 1305.

Figure 14:
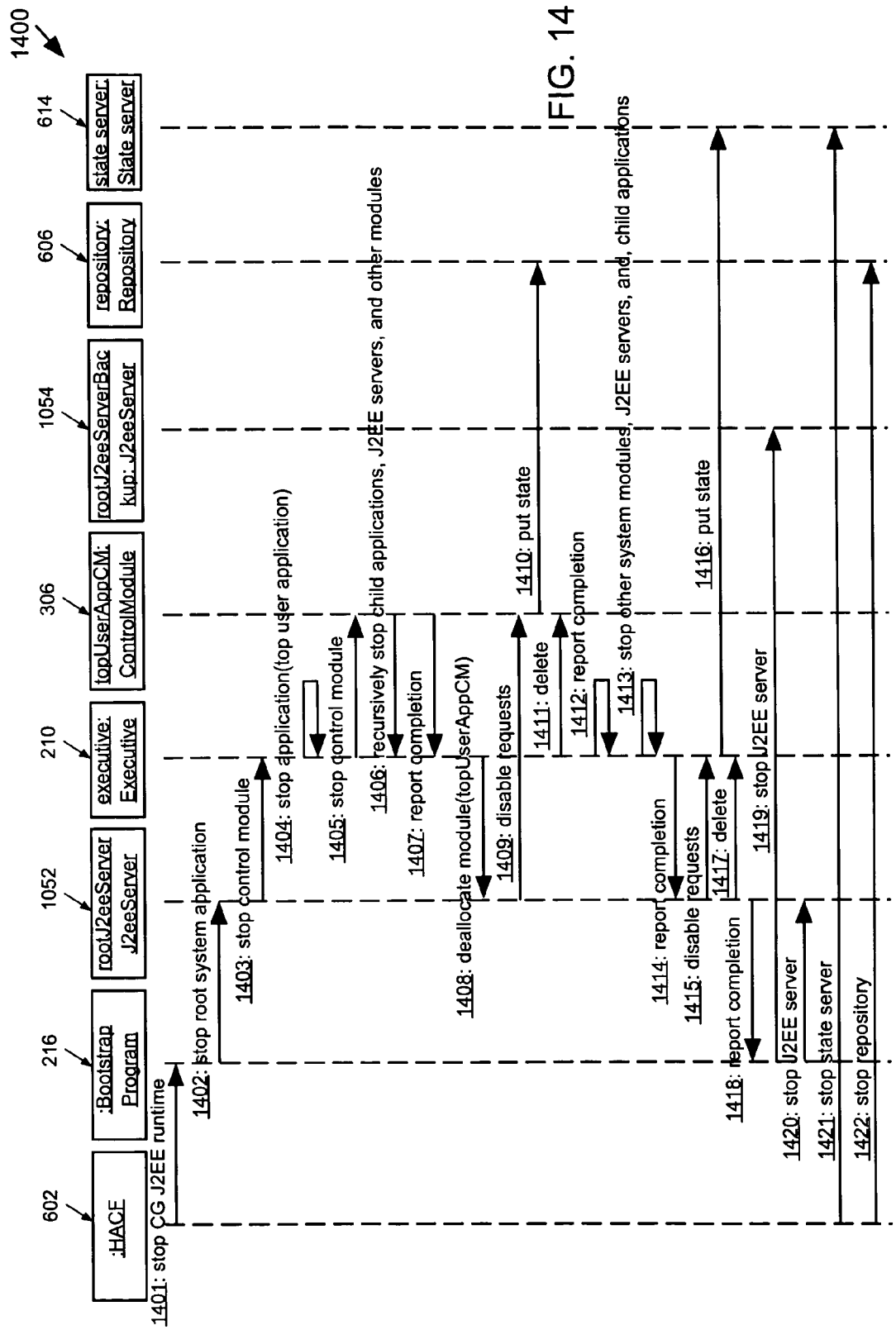
FIG. 14 is a sequencing diagram showing a J2EE system stop sequence, in accordance with an embodiment of the present invention.

FIG. 14 is a sequencing diagram showing a J2EE system stop sequence 1400, in accordance with an embodiment of the present invention. The J2EE system stop sequence 1400 illustrates the shutdown of the J2EE system. Broadly speaking, the underlying Clustering Framework 602 requests the bootstrap program 216 to stop the J2EE system. The bootstrap program 216 stops the Root System Application, which recursively stops all user and system applications. Then the bootstrap program 216 stops the root J2EE server 1052.

Initially, in operation 1401, the underlying Clustering Framework 602 requests the bootstrap program 216 to stop J2EE system. In response, the bootstrap program 216 requests the root J2EE server 1052 to stop the root system application, in operation 1402.

In operation 1403, the root J2EE server 1052 requests the executive 210, which is root system application's control module, to stop. The executive 210 then requests itself to stop the top user application by using the application stop sequence 1100.

In operation 1405, the executive 210 requests the top user application's control module 306, to stop. In response to the request, the top user application's control module 306 requests the executive 210 to stop child applications, J2EE servers, and the top user application's other modules, in operation 1406. To this end, the top user application's control module 306 uses repeatedly the application stop sequence 1100, the J2EE Server stop sequence 1300, and module stop sequence 1200 to perform this task.

In operation 1407, the top user application's control module 306 reports completion of the stop children request to the executive 210. The executive 210 then requests the root J2EE Server 1052 to deallocate the top user application's control module 306, in operation 1408. In response, the root J2EE Server 1052 disables requests to the top user application's control module 306, in operation 1409, and writes any unsaved recoverable state of the top user application's control module 306 to the state server 614, in operation 1410. Then, in operation 1411, the root J2EE Server 1052 deletes the top user application's control module 306 from its memory, and reports completion to the executive 210, in operation 1412.

Thereafter, in operation 1413, the executive 210 stops child system applications, other root system application's modules, and J2EE servers. The executive 210 uses repeatedly the application stop sequence 1100, J2EE Server stop sequence 1300, and module stop sequence 1200 to perform this task. The executive 210 then, in operation 1414, reports completion of the stop request from operation 1403 above.

In operation 1415, the root J2EE Server 1052 disables requests to the executive 210. The root J2EE Server 1052 then writes any unsaved recoverable state of the executive 210 to the state server 614, in operation 1416, and then deletes the executive 210 from its memory, in operation 1417. Thereafter, the root J2EE Server 1052 reports completion to the bootstrap program 216, in operation 1418.

After receiving the completion report from the root J2EE server 1052, the bootstrap program 216 stops the root J2EE server process backup 1054, in operation 1419. Then, in operation 1420, the bootstrap program 216 stops the root J2EE server process 1052. At this point, the Cluster Framework 602 stops the state server subsystem 614, in operation 1421, and then stops the repository subsystem 606, in operation 1422.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for providing application-specific strategies to a JAVA platform, comprising:

a runtime subsystem; and an application having an application control module in communication with the runtime subsystem, the application further including a plurality of service modules in communication with the application control module, the application control module being executed as part of the application and including application-specific policies in a JAVA code form for the JAVA application and providing the application-specific policies to an underlying JAVA platform without breaking the underlying JAVA platform, the application control module being capable of starting a child application, the starting being in accordance with the application-specific policies, the application control module starting the child application by starting a child control module, the child control module being part of the child application, the application control module being configured to provide the application-specific policies to be passed to the child control module.

2. A system as recited in claim 1, wherein the application-specific policies include application-specific start polices.

3. A system as recited in claim 2, wherein the application-specific policies include application-specific stop polices.

4. A system as recited in claim 3, wherein the application control module manages the service modules.

5. A method for starting a child application having application-specific strategies of a parent JAVA application in a JAVA environment, comprising the operations of:

providing a parent control module having the application-specific policies, in a JAVA code form, for the parent JAVA application, and the application-specific policies are provided to an underlying JAVA platform without altering the Java platform, the application-specific policies including an application start policy;

generating a child control module using the parent control module, the child control module being part of the child application;

requesting the child control module to start the child application in accordance with the application-specific policies, the requesting including the application-specific policies from the parent control module; and executing the child application using the child control module operating in response to the requesting.

6. A method as recited in claim 5, further comprising the operation of sending a parent control module request from the parent control module to a runtime executive subsystem, the parent control module request including a message to start the child application, the parent control module request including data for the application-specific policy.

7. A method as recited in claim 5, further comprising the operation of starting a plurality of service modules using the child control module, the plurality of service modules being part of the child application.

8. A method as recited in claim 7, further comprising the operation of sending a request from the child control module to the runtime executive subsystem, the request including a message to start a service module.

9. A method as recited in claim 8, wherein each service module is executed using a server subsystem.

10. A method as recited in claim 9, wherein the child control module includes the application-specific policies of the parent control module.

11. A method for stopping a child application configured with a child control module having application-specific strategies in a JAVA environment, comprising the operations of:

providing a parent control module having application-specific policies for a parent JAVA application, in a JAVA code form, and the application-specific policies being provided to an underlying JAVA platform without altering the JAVA platform, the application-specific policies including an application stop policy;

stopping execution of the child application, the stopping being implemented via the child control module in response to a request originated by the parent control module, the child control module performing the application stop policy of the application-specific policies of the parent control module; and stopping execution of the child control module in response to the request originated by the parent control module.

12. A method as recited in claim 11, further comprising the operation of sending the request from the parent control module to a runtime executive subsystem, the request including a message to stop the child application.

13. A method as recited in claim 12, further comprising the operation of stopping a plurality of service modules using the child control module, the plurality of service modules being part of the child application.

14. A method as recited in claim 13, further comprising the operation of sending a child control module request from the child control module to the runtime executive subsystem, the request including a message to stop the child application.

15. A method as recited in claim 11, wherein the child control module includes the application-specific policies of the parent control module.

* * * * *